United States Patent
Suzuki et al.

(10) Patent No.: US 12,460,603 B2
(45) Date of Patent: Nov. 4, 2025

(54) FUEL SUPPLY DEVICE

(71) Applicant: TOYOTA JIDOSHA KABUSHIKI KAISHA, Toyota (JP)

(72) Inventors: Yuki Suzuki, Kariya (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/906,183

(22) Filed: Oct. 4, 2024

(65) Prior Publication Data

US 2025/0163870 A1 May 22, 2025

(30) Foreign Application Priority Data

Nov. 22, 2023 (JP) ................. 2023-198264

(51) Int. Cl.
*F02B 77/08* (2006.01)
*F02D 19/02* (2006.01)
*F02M 21/02* (2006.01)
*F02M 67/12* (2006.01)

(52) U.S. Cl.
CPC ....... *F02M 21/0242* (2013.01); *F02D 19/021* (2013.01); *F02M 67/12* (2013.01)

(58) Field of Classification Search
CPC ............ F02D 41/0027; F02D 19/0647; F02M 21/0242; F02M 25/06; F02M 21/0215; F02M 25/00; F01L 2810/02; F01M 9/10; F01M 1/08
USPC .................................................. 123/198 DB
See application file for complete search history.

(56) References Cited

U.S. PATENT DOCUMENTS

| | | | | |
|---|---|---|---|---|
| 5,074,256 A | * | 12/1991 | Saito .......... | F01L 3/22 123/41.77 |
| 6,467,466 B1 | * | 10/2002 | Maekawa ....... | F02D 19/021 123/529 |
| 8,240,296 B2 | * | 8/2012 | Marushima ..... | F01M 13/00 123/196 R |
| 8,783,229 B2 | * | 7/2014 | Kim ............ | F02D 19/0689 123/445 |
| 10,954,831 B2 | * | 3/2021 | Berkemeier ..... | F02D 19/02 |
| 10,989,146 B2 | * | 4/2021 | Singh .......... | F02B 11/00 |
| 12,055,109 B1 | * | 8/2024 | Tachibana ...... | F02D 19/024 |
| 2008/0314686 A1 | * | 12/2008 | Romano ......... | F01M 3/04 123/196 R |
| 2013/0000752 A1 | * | 1/2013 | Saito ........... | F02D 19/025 702/138 |

(Continued)

FOREIGN PATENT DOCUMENTS

| JP | H1182177 A | 3/1999 |
|---|---|---|
| JP | 2022044553 A | 3/2022 |

*Primary Examiner* — Logan M Kraft
*Assistant Examiner* — James J Kim

(57) ABSTRACT

A fuel supply device includes a fuel tank, a delivery pipe in which gas fuel to be supplied to a fuel injection valve is stored, a supply passage through which the fuel gas supplied from the fuel tank to the delivery pipe flows, a shut-off valve provided in the supply passage, an oil supply device that supplies oil to a downstream portion of the supply passage, and a controller. The controller executes an oil supply process during operation of the internal combustion engine to close the shut-off valve to stop the supply of the gas fuel to the delivery pipe, and supply the oil to the downstream portion by the oil supply device when the pressure in the delivery pipe has dropped.

4 Claims, 3 Drawing Sheets

(56) References Cited

U.S. PATENT DOCUMENTS

2016/0290249 A1* 10/2016 Onishi .................... F02D 41/22
2019/0242307 A1*  8/2019 Engfehr .............. F02D 19/0628
2024/0376852 A1* 11/2024 Karrer ................ F02M 63/0001

* cited by examiner

FUEL SUPPLY DEVICE

CROSS-REFERENCE TO RELATED APPLICATIONS

This application is based upon and claims the benefit of priority from prior Japanese Patent Application No. 2023-198264, filed on Nov. 22, 2023, the entire contents of which are incorporated herein by reference.

BACKGROUND

1. Field

The present disclosure relates to a fuel supply device that supplies gas fuel to an internal combustion engine that uses gas fuel as fuel.

2. Description of Related Art

Japanese Laid-Open Patent Publication No. H11-82177 discloses a supply device that supplies gas fuel to an internal combustion engine that uses gas fuel as fuel. The supply device includes a fuel injection valve, a pipe through which fuel to be supplied to the fuel injection valve flows, and an oil pump that supplies oil into the pipe.

When oil is supplied to the pipe under a situation where the fuel pressure in the pipe is high, it is necessary to increase the pressure of the oil. In order to increase the pressure of the oil, it is necessary to provide a configuration for increasing the pressure of the oil. This complicates the configuration of the supply device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel supply device for an internal combustion engine including a fuel injection valve that injects gas fuel is provided. The fuel supply device includes a fuel tank that stores the gas fuel at high pressure, a delivery pipe that stores the gas fuel to be supplied to the fuel injection valve, a supply passage through which the fuel gas supplied from the fuel tank to the delivery pipe flows, a shut-off valve provided in the supply passage, an oil supply device, and a controller. The shut-off valve closed when supply of the gas fuel to the delivery pipe is stopped. The oil supply device supplies oil to a downstream portion of the supply passage. The downstream portion is a portion between a position of the shut-off valve and a part connected to the delivery pipe. The controller controls the shut-off valve and the oil supply device. The controller is configured to execute an oil supply process during operation of the internal combustion engine to close the shut-off valve to stop the supply of the gas fuel to the delivery pipe, and supply the oil to the downstream portion by the oil supply device when the pressure in the delivery pipe is lower than that before the shut-off valve is closed.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a fuel supply device will be described with reference to FIGS. 1 to 3.

Internal Combustion Engine

Figure 1:
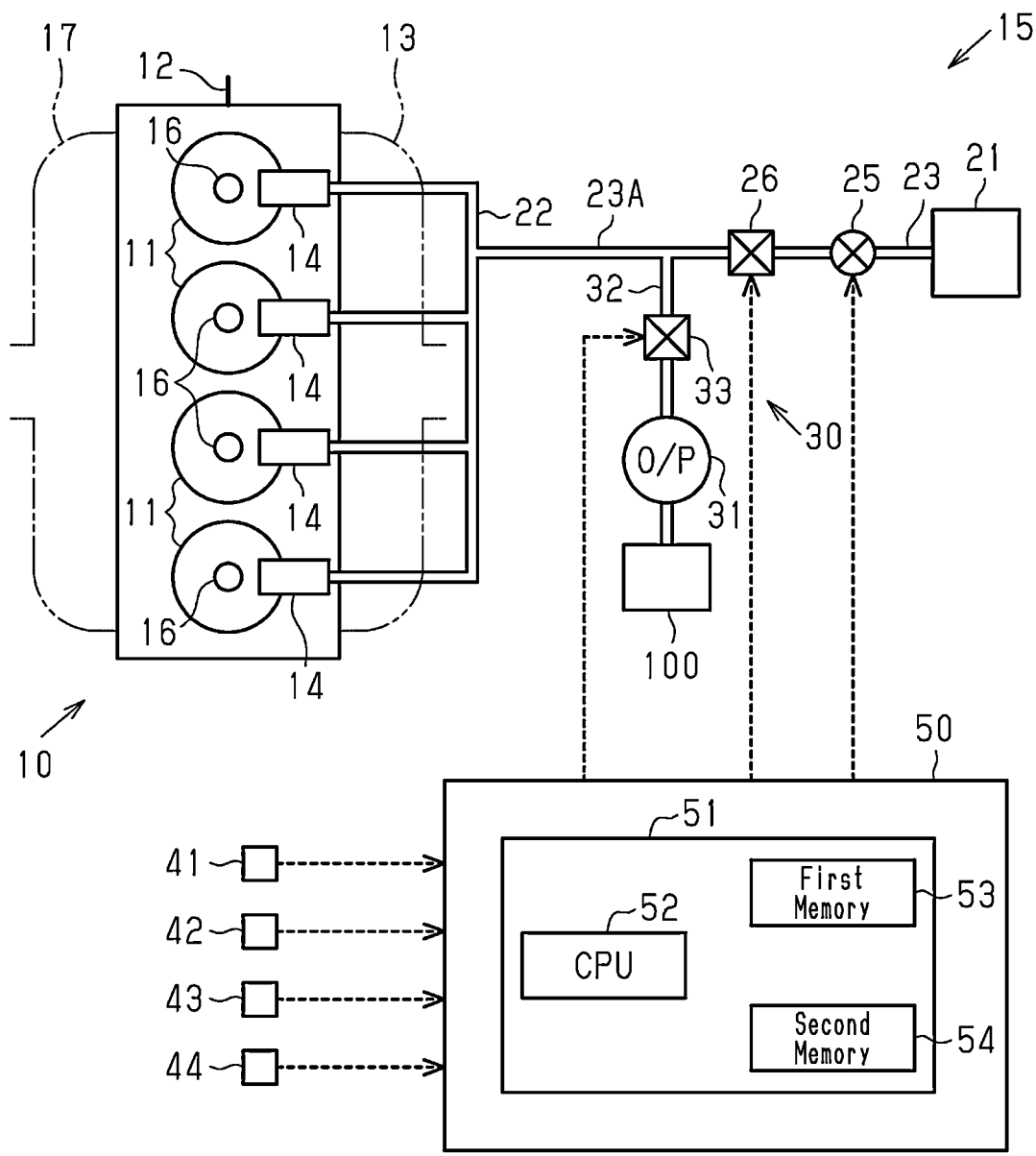
FIG. 1 is a diagram schematically showing the configuration of a fuel supply device according to an embodiment and an internal combustion engine to which gas fuel is supplied from the fuel supply device.
Figure 2:
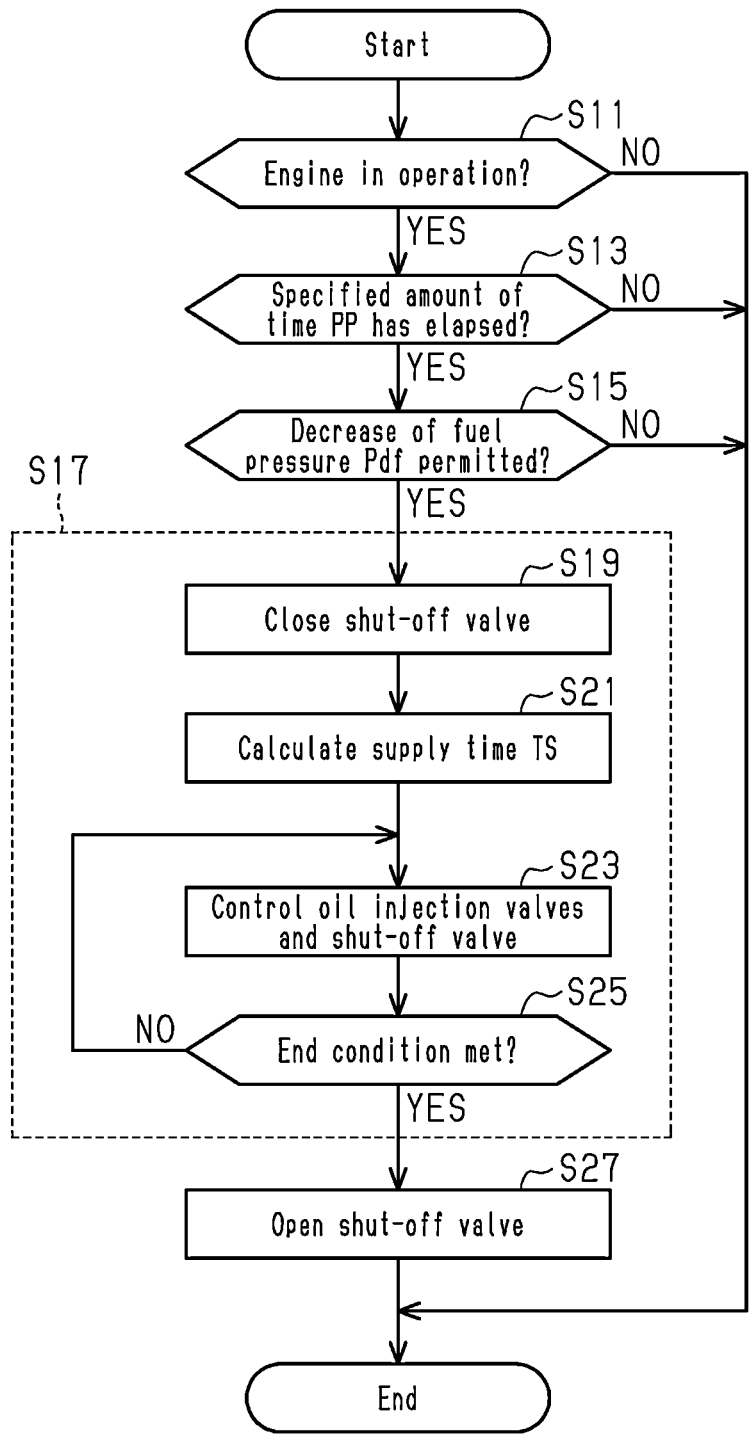
FIG. 2 is a flowchart showing a processing routine executed by processing circuitry included in the fuel supply device shown in FIG. 1.

FIG. 1 shows an internal combustion engine 10 mounted on a vehicle. The internal combustion engine 10 is an internal combustion engine that uses gas fuel as fuel. One example of a gaseous fuel is hydrogen gas.

The internal combustion engine 10 includes cylinders 11 and a crankshaft 12. A piston is disposed in each of the multiple cylinders 11. The pistons reciprocate in the multiple cylinders 11 to rotate the crankshaft 12.

The internal combustion engine 10 includes an intake passage 13, multiple fuel injection valves 14, a fuel supply device 15, multiple spark plugs 16, and an exhaust passage 17. The intake passage 13 is connected to the multiple cylinders 11. The intake passage 13 is a passage through which air to be introduced into the multiple cylinders 11 flows.

Each of the multiple fuel injection valves 14 injects the gas fuel supplied from the fuel supply device 15. In the example shown in FIG. 1, an in-cylinder injection valve that directly injects gas fuel into the cylinder 11 is employed as the fuel injection valve 14. The internal combustion engine 10 may include, as the fuel injection valve 14, a port injection valve that injects gas fuel into the intake passage 13. The configuration of the fuel supply device 15 will be described later.

The multiple spark plugs 16 ignite an air-fuel mixture containing air and gas fuel in the corresponding cylinders 11. Thus, the air-fuel mixture is combusted in the multiple cylinders 11. Exhaust gas is generated in the multiple cylinders 11 by the combustion of the air-fuel mixture. The exhaust gas in the multiple cylinders 11 is discharged to the exhaust passage 17.

Fuel Supply Device

The fuel supply device 15 includes a fuel tank 21, a delivery pipe 22, and a supply passage 23. The fuel tank 21 stores high-pressure gas fuel. The delivery pipe 22 temporarily stores the gas fuel to be supplied to the multiple fuel injection valves 14. The multiple fuel injection valves 14 are connected to the delivery pipe 22. The supply passage 23 is a passage through which the gas fuel supplied from the fuel tank 21 to the delivery pipe 22 flows. An upstream end of the supply passage 23 is connected to the fuel tank 21. A downstream end of the supply passage 23 is connected to the delivery pipe 22.

The fuel supply device 15 includes a pressure reduction valve 25 and a shut-off valve 26. The pressure reduction valve 25 is provided in the supply passage 23. An example of the pressure reduction valve 25 is an electronically controlled electromagnetic valve. The pressure of the gas fuel supplied to the delivery pipe 22 via the supply passage 23 can be adjusted by controlling the opening degree of the pressure reduction valve 25 and the length of the valve opening period of the pressure reduction valve 25.

The shut-off valve 26 is provided in a portion of the supply passage 23 between the position of the pressure reduction valve 25 and the part connected to the delivery pipe 22. An example of the shut-off valve 26 is an electronically controlled electromagnetic valve. When the shut-off valve 26 is opened, the gas fuel regulated in pressure by the pressure reduction valve 25 is supplied to the delivery pipe 22 via the supply passage 23. On the other hand, when the shut-off valve 26 is closed, the supply of the gas fuel to the delivery pipe 22 via the supply passage 23 is stopped.

The fuel supply device 15 includes an oil supply device 30. The oil supply device 30 is a device that supplies oil stored in the oil tank 100 to the delivery pipe 22. The oil supply device 30 includes an oil pump 31, an oil supply passage 32, and an oil injection valve 33. The oil pump 31 pumps up oil from the oil tank 100 and discharges the oil to the oil supply passage 32. The oil pump 31 operates such that the pressure of the oil in the oil supply passage 32 is maintained at a predetermined pressure.

The oil supply passage 32 is a passage through which the oil pumped by the oil pump 31 flows. The oil supply passage 32 is connected to the downstream portion 23A of the supply passage 23. The downstream portion 23A is a portion of the supply passage 23 between the position of the shut-off valve 26 and a part connected to the delivery pipe 22. The oil injection valve 33 is provided in the oil supply passage 32. The oil injection valve 33 can inject the oil in the oil supply passage 32 to the downstream portion 23A. That is, the oil supply device 30 is configured to be able to supply oil to the downstream portion 23A.

The fuel supply device 15 includes multiple sensors that output signals corresponding to detection results to a controller 50 described later. The multiple sensors include an oil pressure sensor 41, an oil temperature sensor 42, a fuel pressure sensor 43, and a fuel temperature sensor 44. The oil pressure sensor 41 detects the pressure of the oil in the oil supply passage 32. The oil temperature sensor 42 detects the temperature of the oil in the oil supply passage 32. The fuel pressure sensor 43 detects the pressure of the gas fuel in the delivery pipe 22. The fuel temperature sensor 44 detects the temperature of the gas fuel in the delivery pipe 22.

The oil pressure based on the detection signal of the oil temperature sensor 42 is referred to as an oil pressure Poil. The temperature of the oil based on the detection signal of the oil temperature sensor 42 is referred to as an oil temperature TPoil. The pressure of the gas fuel based on the detection signal of the fuel pressure sensor 43 is referred to as fuel pressure Pdf. The temperature of the gas fuel based on the detection signal of the fuel temperature sensor 44 is referred to as a fuel temperature TPdf.

The fuel supply device 15 includes a controller 50 that controls the pressure reduction valve 25, the shut-off valve 26, and the oil supply device 30. The controller 50 includes a processing circuitry 51. An example of the processing circuitry 51 is an electronic control unit. In this case, the processing circuitry 51 includes a CPU 52, a first memory 53, and a second memory 54. The first memory 53 stores a control program executed by the CPU 52. The second memory 54 stores the calculation result of the CPU 52 and the like. When the CPU 52 executes the control program stored in the first memory 53, the processing circuitry 51 controls the pressure reduction valve 25, the shut-off valve 26, and the oil supply device 30.

Oil Supply Process

In an internal combustion engine using liquid fuel such as gasoline as fuel, a portion from a delivery pipe to an injection port of a fuel injection valve is lubricated by the liquid fuel. However, the lubricity of the gas fuel which is the fuel of the internal combustion engine 10 is lower than that of the liquid fuel.

Therefore, the controller 50 executes an oil supply process for supplying oil from the oil supply device 30 to the delivery pipe 22. The controller 50 executes the oil supply process during operation of the internal combustion engine 10. In the oil supply process, the controller 50 closes the shut-off valve 26 to stop the supply of the gas fuel to the delivery pipe 22. The controller 50 supplies the oil to the downstream portion 23A by the oil supply device 30 when the pressure in the delivery pipe 22 is lower than that before the shut-off valve 26 is closed. Specifically, the controller 50 decreases the fuel pressure Pdf until the fuel pressure Pdf becomes less than the oil pressure Poil. In this state, the controller 50 supplies the oil in the oil supply passage 32 to the downstream portion 23A by opening the oil injection valve 33. Thereafter, when terminating the oil supply process, the controller 50 stops the oil supply device 30 from supplying the oil to the downstream portion 23A, and opens the shut-off valve 26 to increase the fuel pressure Pdf.

Flow of Processing when Supplying Oil to Delivery Pipe

A flow of a process executed by the processing circuitry 51 when the oil supply process is executed will be described with reference to FIG. 2. The processing circuitry 51 repeatedly executes the processing routine shown in FIG. 2.

In step S11, the processing circuitry 51 determines whether the internal combustion engine 10 is in operation. When the operating state of the internal combustion engine 10 is an operating state in which the gas fuel is injected from the multiple fuel injection valves 14, it is considered that the internal combustion engine 10 is in operation. When the operating state of the internal combustion engine 10 is an operating state in which the injection of the gas fuel from the multiple fuel injection valves 14 is stopped, it is considered that the internal combustion engine 10 is not in operation. When the processing circuitry 51 determines that the internal combustion engine 10 is in operation (S11: YES), the processing circuitry 51 shifts the processing to step S13. On the other hand, when the processing circuitry 51 determines that the internal combustion engine 10 is not in operation (S11: NO), the processing circuitry 51 temporarily ends this processing routine.

In step S13, the processing circuitry 51 determines whether a specified amount of time PP has elapsed from a point in time at which the oil supply process was executed last time.

When the oil supply process is executed, a sufficient amount of oil is present in the delivery pipe 22. However, the oil is injected from the fuel injection valve 14 together with the gas fuel. Therefore, the amount of oil in the delivery pipe 22 is gradually reduced by the operation of the fuel injection valve 14. Therefore, a criterion for determining whether a sufficient amount of oil for lubrication between the delivery pipe 22 and the injection port of the fuel injection valve 14 remains in the delivery pipe 22 is set in advance as the specified amount of time PP.

When the processing circuitry 51 determines that the specified amount of time PP has elapsed from the point in time at which the oil supply process was executed last time (S13: YES), the processing circuitry 51 shifts the process to step S15. On the other hand, if the processing circuitry 51 determines that the specified amount of time PP has not elapsed from the point in time at which the oil supply process was executed last time (S13: NO), the processing circuitry 51 temporarily ends this processing routine.

In step S15, the processing circuitry 51 determines whether the decrease of the fuel pressure Pdf is permitted. For example, the processing circuitry 51 determines that the decrease of the fuel pressure Pdf is permitted when at least one of the following conditions (A1), (A2), and (A3) is satisfied. On the other hand, when none of the following conditions (A1), (A2), and (A3) is satisfied, the processing circuitry 51 determines that the decrease in the fuel pressure Pdf is not permitted.

(A1) The internal combustion engine 10 is idling.
(A2) The rotation speed of the crankshaft 12 has not started decreasing. The rotation speed of the crankshaft 12 corresponds to the rotation speed of the internal combustion engine 10.
(A3) The operation of the internal combustion engine 10 has not been stopped.

When the internal combustion engine 10 is idling, the amount of gaseous fuel injected by the fuel injection valve 14 is smaller than when the internal combustion engine 10 is operating under a high load. Therefore, when the internal combustion engine 10 is idling, an appropriate amount of gas fuel can be injected from the fuel injection valve 14 even if the fuel pressure Pdf is low.

In a case in which the rotation speed of the internal combustion engine 10 is decreased, the injection amount of the gas fuel of the fuel injection valve 14 is smaller than in a case in which the rotation speed of the internal combustion engine 10 is increased. Therefore, when the rotation speed of the internal combustion engine 10 is decreased, an appropriate amount of gas fuel can be injected from the fuel injection valve 14 even if the fuel pressure Pdf is low.

When the operation of the internal combustion engine 10 is stopped, the injection of the gas fuel by the fuel injection valve 14 is also stopped. Therefore, before the operation of the internal combustion engine 10 is stopped, even if the fuel pressure Pdf is low, an appropriate amount of gas fuel can be injected from the fuel injection valve 14.

When the vehicle on which the internal combustion engine 10 is mounted is a hybrid vehicle, the processing circuitry 51 can know the point in time at which the operation of the internal combustion engine 10 is stopped.

When the processing circuitry 51 determines that the decrease of the fuel pressure Pdf is permitted (S15: YES), the processing circuitry 51 shifts the processing to step S17.

On the other hand, when the processing circuitry 51 determines that the decrease of the fuel pressure Pdf is not permitted (S15: NO), the processing circuitry 51 temporarily ends this processing routine.

In step S17, the processing circuitry 51 executes an oil supply process. To be specific, in step S19, the processing circuitry 51 closes the shut-off valve 26. Since the gas fuel in the delivery pipe 22 is consumed by the operation of the multiple fuel injection valves 14, the processing circuitry 51 can start to decrease the fuel pressure Pdf.

In the next step S21, the processing circuitry 51 calculates the supply time TS. The supply time TS is a length of time during which oil is supplied into the delivery pipe 22 by the oil supply device 30. The processing circuitry 51 sets a longer time as the supply time TS as the remaining amount of the oil in the delivery pipe 22 can be estimated to be smaller. In this case, the processing circuitry 51 acquires a parameter correlated with the remaining amount of oil in the delivery pipe 22. Then, the processing circuitry 51 sets a longer time as the supply time TS as the remaining oil amount that can be estimated from the parameter is smaller. Examples of such a parameter include the elapsed time from the previous end of the oil supply process, the travel distance of the vehicle from the previous end of the oil supply process, and the total number of operations of the multiple fuel injection valves 14 from the previous end of the oil supply process.

Further, when the gas fuel is injected from the fuel injection valve 14, the lower the oil temperature TPoil, the more difficult it is for the oil to be injected from the fuel injection valve 14. Therefore, the processing circuitry 51 estimates the remaining amount of the oil in the delivery pipe 22 based on the transition of the oil temperature TPoil from the previous end time of the oil supply process or the mean value of the oil temperature TPoil from that time. Then, the processing circuitry 51 may set a longer time as the supply time TS as the estimated value of the remaining amount of oil is smaller.

After calculating the supply time TS, the processing circuitry 51 shifts the processing to step S23. In step S23, the processing circuitry 51 executes control of the oil injection valves 33 and the shut-off valve 26.

The process of step S23 will be described with reference to FIG. 3. When the fuel pressure Pdf is equal to or higher than the target fuel pressure Pdfth, the processing circuitry 51 does not cause the oil injection valves 33 to inject oil. The target fuel pressures Pdfth are set to be higher than the lower limit of the fuel pressures Pdf at which the fuel injection valves 14 can inject the gas fuel, and to be lower than the oil pressures Poil.

When the fuel pressure Pdf becomes lower than the target fuel pressure Pdfth, the processing circuitry 51 causes the oil injection valve 33 to start injecting oil.

After the oil injection valve 33 starts to inject oil, the processing circuitry 51 controls the pressure reduction valve 25 so that the fuel pressure Pdf is included in the target fuel pressure region APdf. That is, when the fuel pressure Pdf approaches the lower limit of the target fuel pressure Pdfth, the pressure reduction valve 25 is opened to increase the fuel pressure Pdf. When the fuel pressure Pdf approaches the upper limit of the target fuel pressure region APdf, the processing circuitry 51 closes the pressure reduction valve 25. The processing circuitry 51 adjusts the fuel pressure Pdf by repeatedly opening and closing the pressure reduction valve 25 during a period in which the oil injection valve 33 is injecting oil.

The flow rate of oil from the oil supply passage 32 to the downstream portion 23A when the oil injection valves 33 are opened varies depending on the difference between the oil pressure Poil and the fuel pressure Pdf and the oil temperature TPoil. Therefore, the processing circuitry 51 controls the energization time of the solenoid of the oil injection valve 33 based on the difference between the oil pressure Poil and the fuel pressure Pdf and the oil temperature TPoil.

Returning to FIG. 2, in step S25, the processing circuitry 51 determines whether a condition for ending the oil supply process is satisfied. When the elapsed time from the start time of the current oil supply process does not reach the supply time TS, it can be considered that the end condition is not satisfied. On the other hand, when the elapsed time from the start point in time reaches the supply time TS, it can be considered that the end condition is satisfied. When it is determined that the end condition is not satisfied (S25: NO), the processing circuitry 51 shifts the processing to step S23. That is, the processing circuitry 51 continues the oil supply process. On the other hand, when the processing circuitry 51 determines that the end condition is satisfied (S25: YES), the processing circuitry 51 stops the oil injection of the oil injection valve 33 and ends the oil supply process.

When the oil supply process is finished, the processing circuitry 51 shifts the process to step S27. In step S27, the processing circuitry 51 opens the shut-off valve 26. Then, the processing circuitry 51 temporarily ends this processing routine.

Operation and Advantages of Present Embodiment

Operations and effects of the present embodiment will be described with reference to FIG. 3. In the example shown in FIG. 3, the internal combustion engine 10 is in idle operation.

Figure 3:
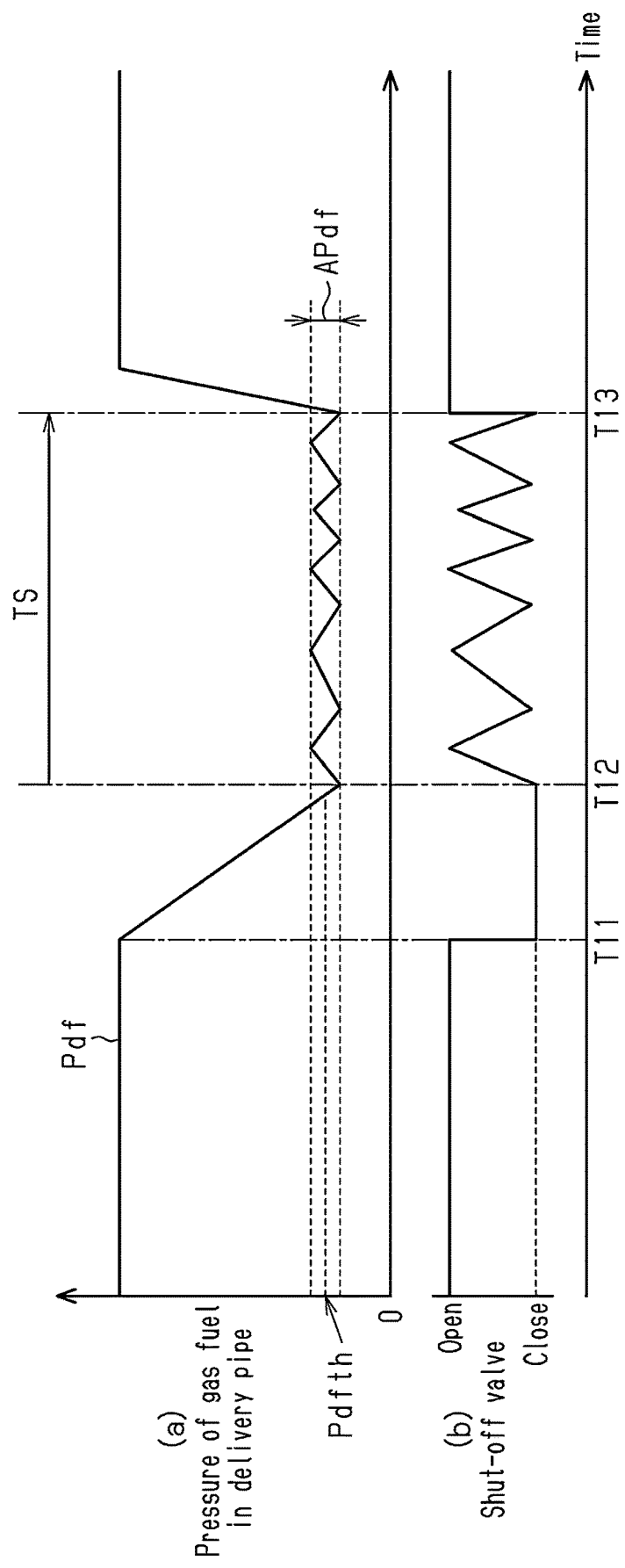
FIG. 3 is a timing diagram, in which part (a) shows changes in the pressure of gas fuel in a delivery pipe, and part (b) shows changes in an actuation state of a shut-off valve.

As shown in part (a) and part (b) of FIG. 3, point in time T11 during the operation of the internal combustion engine 10 is a point in time at which the specified amount of time PP has elapsed from the point in time at which the oil supply process was executed last time. Since the internal combustion engine 10 is idling, the processing circuitry 51 starts the oil supply process. Then, the shut-off valve 26 is closed.

In order to maintain a state in which the internal combustion engine 10 performs idle operation even in this state, each of the multiple fuel injection valves 14 injects the gas fuel. Therefore, the fuel pressure Pdf, which is the pressure of the gas fuel in the delivery pipe 22, gradually decreases. At point in time T12, the fuel pressure Pdf becomes lower than the target fuel pressure Pdfth. Therefore, the processing circuitry 51 causes the oil injection valve 33 to start injecting oil. Then, oil is supplied from the oil supply device 30 to the downstream portion 23A. Thus, the oil is supplied into the delivery pipe 22. As a result, the lubricity between the delivery pipe 22 and the injection port of the fuel injection valve 14 is maintained by the oil. Therefore, the progress of wear of the components of the fuel injection valve 14 is suppressed.

At a subsequent point in time T13, the condition for ending the oil supply process is satisfied. Then, since the processing circuitry 51 ends the oil supply process, the injection of the oil of the oil injection valve 33 is ended. Further, the shut-off valve 26 is opened. Thus, the fuel pressure Pdf becomes higher than that during the execution of the oil supply process.

The present embodiment has the following advantages.
(1) The oil supply device 30 supplies oil into the delivery pipe 22 after the fuel pressure Pdf is sufficiently reduced. That is, the oil supply device 30 may not supply the oil into the delivery pipe 22 in a state where the fuel pressure Pdf is high. Therefore, the oil supply device 30 does not have to include a high-pressure pump that pressurizes oil in order to inject high-pressure oil from the oil injection valve 33. Therefore, the fuel supply device 15 can supply oil into the delivery pipe 22 without complicating the device configuration.
(2) The oil supply device 30 is configured to execute the oil supply process on condition that the specified amount of time PP has elapsed from the point in time at which the oil supply process was executed last time. As a result, the fuel supply device 15 can suppress excessive execution opportunities of the oil supply process.
(3) When at least one of the conditions (A1), (A2), and (A3) is met, the injection amount of gas fuel injected from the fuel injection valves 14 can be appropriately controlled even if the pressure of the gas fuel in the delivery pipe 22 is relatively low. Therefore, the oil supply device 30 supplies oil into the delivery pipe 22 when at least one of the above-described conditions (A1), (A2), and (A3) is satisfied. Thus, the fuel supply device 15 can supply the oil into the delivery pipe 22 while appropriately operating the internal combustion engine 10.

Modified Examples

The above embodiment may be modified as follows. The above-described embodiment and the following modifications can be combined as long as the combined modifications remain technically consistent with each other.

The processing circuitry 51 may execute the oil supply process even when none of the above-described conditions (A1), (A2), and (A3) is satisfied as long as the specified amount of time PP has elapsed from the point in time at which the oil supply process was executed last time.

As long as all of the above conditions (A1), (A2), and (A3) are satisfied, the processing circuitry 51 may execute the oil supply process regardless of whether the specified amount of time PP has elapsed from the point in time at which the oil supply process was executed last time.

The rate of decrease in the remaining amount of oil in the delivery pipe 22 may vary depending on how the internal combustion engine 10 is operated. Therefore, the specified amount of time PP may be changed depending on the operating state of the internal combustion engine 10. For example, the processing circuitry 51 may determine that the specified amount of time has elapsed in a case in which the number of times of injection of the gas fuel of the fuel injection valve 14 from a point in time at which the oil supply process was previously executed becomes equal to or greater than a specified number of times. Even in this case, the processing circuitry 51 can change the specified amount of time depending on the operating state of the internal combustion engine 10.

The internal combustion engine to which the fuel supply device is applied may be an internal combustion engine that uses gas fuel other than hydrogen as fuel. Examples of the gas fuel other than hydrogen include compressed natural gas.

The processing circuitry 51 is not limited to a device that includes a CPU and a ROM and executes software processing. That is, the processing circuitry 51 may be modified as long as it has any one of the following configurations (a) to (c).

(a) The processing circuitry 51 includes one or more processors that execute various processes in accordance with a computer program. The processor includes a CPU and a memory, such as a RAM and ROM. The memory stores program codes or instructions configured to cause the CPU to execute processes. The memory, which is a computer-readable medium, includes any type of media that are accessible by general-purpose computers and dedicated computers.

(b) The processing circuitry 51 includes one or more dedicated hardware circuits that execute various processes. The dedicated hardware circuits include, for example, an application specific integrated circuit (ASIC) and a field programmable gate array (FPGA).

(c) The processing circuitry 51 includes one or more processors that execute part of various processes according to programs and one or more dedicated hardware circuits that execute the remaining processes.

The phrase "at least one of" as used in this description means "one or more" of desired options. As an example, the expression "at least one" as used herein means "only one option" or "both two options" if the number of options is two. As another example, the expression "at least one" used herein means "only one option" or "a combination of any two or more options" if the number of options is three or more.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel supply device for an internal combustion engine including a fuel injection valve that injects gas fuel, the fuel supply device comprising:
   a fuel tank that stores the gas fuel at high pressure;
   a delivery pipe that stores the gas fuel to be supplied to the fuel injection valve;
   a supply passage through which the fuel gas supplied from the fuel tank to the delivery pipe flows;
   a shut-off valve provided in the supply passage, the shut-off valve being closed when supply of the gas fuel to the delivery pipe is stopped;
   an oil supply device that supplies oil to a downstream portion of the supply passage, the downstream portion being a portion between a position of the shut-off valve and a part connected to the delivery pipe; and
   a controller that controls the shut-off valve and the oil supply device,
   wherein the controller is configured to execute an oil supply process during operation of the internal combustion engine to
      close the shut-off valve to stop the supply of the gas fuel to the delivery pipe, and
      supply the oil to the downstream portion by the oil supply device when the pressure in the delivery pipe is lower than that before the shut-off valve is closed.

2. The fuel supply device according to claim 1, wherein the controller is configured to execute the oil supply process on condition that a specified amount of time has elapsed from a point in time at which the oil supply process was executed last time.

3. The fuel supply device according to claim 2, wherein the controller is configured to change a length of the specified amount of time depending on an operating state of the internal combustion engine.

4. The fuel supply device according to claim 2, wherein the controller is configured to execute the oil supply process when at least one of the following conditions is met in a case in which the specified amount of time has elapsed from the point in time at which the oil supply process was executed last time, the condition being:
   the internal combustion engine is idling;
   the operation of the internal combustion engine has not been stopped; and
   a rotation speed of the internal combustion engine has not started decreasing.

* * * * *